May 10, 1927 Re. 16,621

L. BUSHA

STRIP SHINGLE

Original Filed Feb. 11, 1924

Inventor
LEON BUSHA

By Paul, Paul & Moore
ATTORNEYS

Reissued May 10, 1927. Re. 16,621

UNITED STATES PATENT OFFICE.

LEON BUSHA, OF MINNEAPOLIS, MINNESOTA, ASSIGNOR TO WILLIAM EDWIN NELSON, OF MINNEAPOLIS, MINNESOTA.

STRIP SHINGLE.

Original No. 1,533,969, dated April 14, 1925, Serial No. 692,157, filed February 11, 1924. Application for reissue filed May 28, 1925. Serial No. 33,562.

This invention relates to improvements in strip shingles for covering the roofs or walls of buildings, said shingles being formed preferably of roofing felt or material of a similar nature, with a mineral covering or surface usually formed of finely divided slate, stone, gravel, or similar material.

The present invention is an improvement on the strip shingle shown and described in Letters Patent of the United States issued to me August 14th, 1923, No. 1,464,494.

The invention consists generally in the constructions and combinations hereinafter described and particularly pointed out in the claims.

Figure 2:
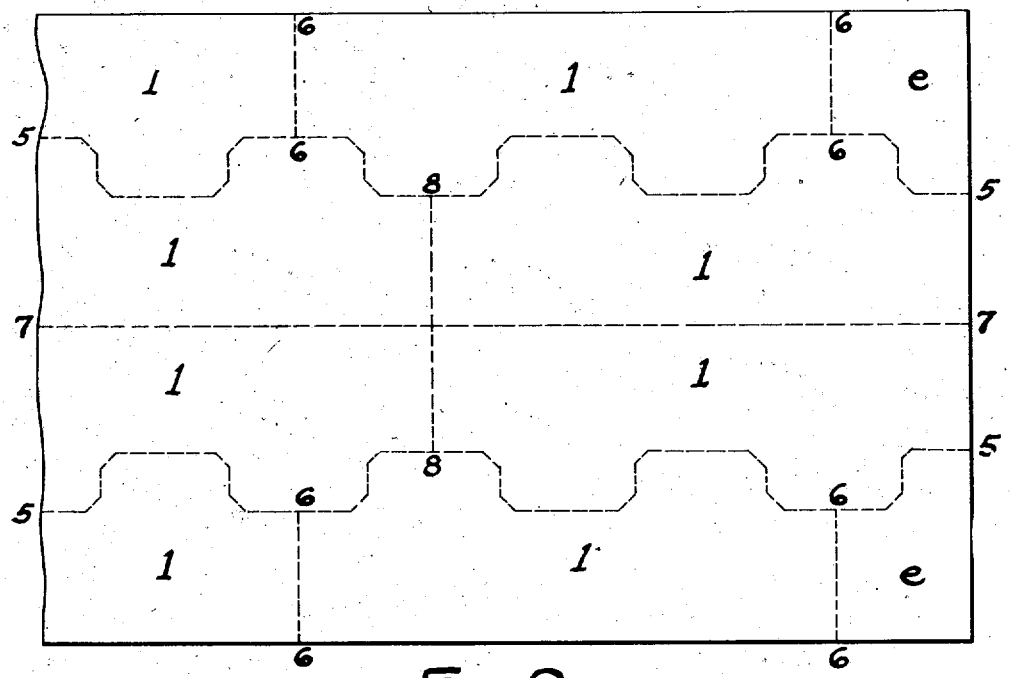
Figure 2 is a plan of a sheet of material, or a portion of a sheet, illustrating the manner in which the strip shingles may be cut therefrom.

In the drawings, 1 represents the body portion of the strip shingle, which may be formed in the usual way, of a foundation sheet of wool felt, with a coating or layer of pitch, asphalt or the like, on one surface of the felt, and a layer of crushed slate, stone, gravel, or similar material pressed into the coating and held in place thereby.

I form, at one edge of the body, projecting extensions or butts, 2—2, here shown of generally rectangular form, but with the base of the butt widened by the diagonal or inclined lines *a—b*, and the lower end of the butt correspondingly narrowed by the inclined or diagonal lines, *c—d*. Separating spaces 3—3 are thereby provided, each equal in outline or contour, and area to the outline, contour and area of each of the butts 2. The shingle may be cut from a rectangular sheet of single width by separating the sheet longitudinally on the dotted lines 5—5 Figure 2, and transversally on the dotted lines 6—6 and 8—8.

If the sheet is of double width it will also be severed along the straight dotted line 7—7. From a single width sheet two strip shingles may be formed by cutting in the manner described, and from a double width sheet four such shingles may be formed.

Figure 3:
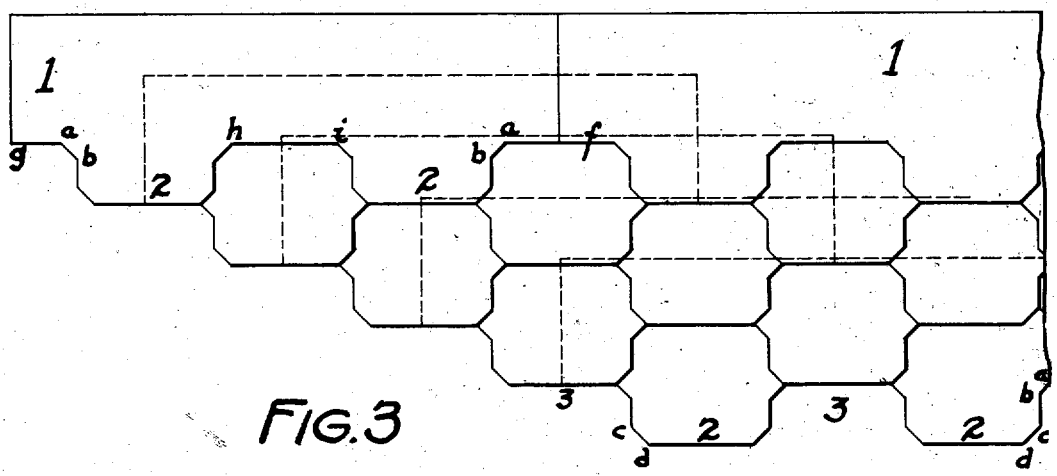
Figure 3 is a plan view showing a preferred manner of laying the shingles to form a roof or wall covering.
Figure 1:
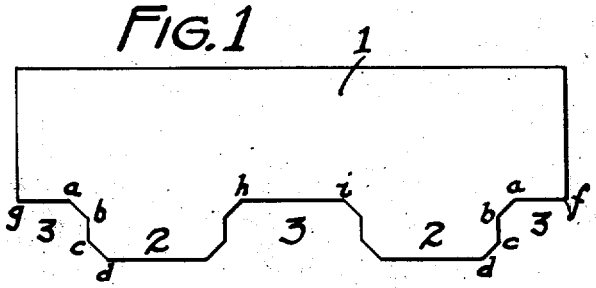
Figure 1 is a plan view of a single shingle embodying my invention.

In starting the manufacture of the shingles from a double strip, as indicated in Figure 2, there will be at the end of the strip two small corners *e—e* which will be wasted, but there will be no further waste until the opposite end of the sheet is reached. In producing this strip shingle the butts 2—2 are located at the same distance from the ends of the body of the shingle, that is to say, the line *a—f*, that measures the distance from the right hand butt to the end of the shingle strip, is equal to the line *a—g* that measures the distance from the left hand butt to the left hand end of the shingle. The distance *a—f* or *a—g* is equal to one-half the distance *h—i*, between the butts the total vertical length of the butt will be substantially one-third the distance from the lower edge of the butt to the upper edge of the shingle so that in producing the shingle from a strip of material as outlined above, there will be no waste of material except at the corners of the ends of the strip. This produces an entirely symmetrical shingle and when the same is laid on a roof in overlapping relation as illustrated in Figure 3 of the drawings the roof will not only have a symmetrical appearance, but every part of the roof will have at least two layers of material covering it.

I do not limit myself to any particular material for forming the same.

I claim as my invention:

1. A strip shingle comprising a body portion and each shingle having a plurality of separated butts projecting from one edge thereof, the butts being connected with the body portion at the base by inclined lines, said butts also having vertical side edges, the ends of the butts being correspondingly shaped with adjacent separating spaces and the distance from the point where the outer inclined line of one butt joins the body portion to the end of the shingle being equal to the distance from the point where the outer inclined line of the other butt joins the body portion to the end of the shingle strip.

2. A shingle strip comprising a body portion and a butt projecting from one edge thereof, the butt being connected with the body portion at the base by inclined lines on either side of the butt, said butt also having vertical side edges whereby when he shingles are located end to end there will be a separating space between proximate butts, the end of the butt being correspondingly shaped with adjacent separating spaces and the distance from the point where the inclined line of each butt joins the body portion to one end of the shingle being equal to the distance from the point where the corresponding inclined line on the other side of the butt joins the body portion to the middle point of the separating space between proximate butts.

3. A strip shingle comprising a body portion and each shingle having a plurality of separated butts projecting from one edge thereof, the butts being connected with the body portion at the base by inclined lines, the ends of the butts being bounded by a horizontal and two inclined lines and the butts being correspondingly shaped with adjacent separating spaces and the distance from the point where the outer inclined line of one butt joins the body portion to the end of the shingle being equal to the distance from the point where the outer inclined line of the other butt joins the body portion to the end of the shingle strip.

4. A shingle strip comprising a body portion and a butt projecting from one edge thereof, whereby when the shingles are located end to end there will be a separating space between proximate butts, the end of the butts being correspondingly shaped with adjacent separating spaces, and the distance from the point where the line of each butt joins the body portion to one end of the shingle being equal to the distance from the point where the corresponding lines on the other side of the butt joins the body portion to the middle point of the separating space between proximate butts; said shingle being so proportioned that the distance from the tip or lower side of each butt to the top of the shingle shall be a distance equal to more than three times the length of projection of said butt from the main body of the said shingle.

In witness whereof I have hereunto set my hand this 27th day of May, 1925.

LEON BUSHA.